D. L. EMERSON.
Harvester.
No. 68,615.
2 Sheets—Sheet 1.
Patented Sept. 10, 1867.
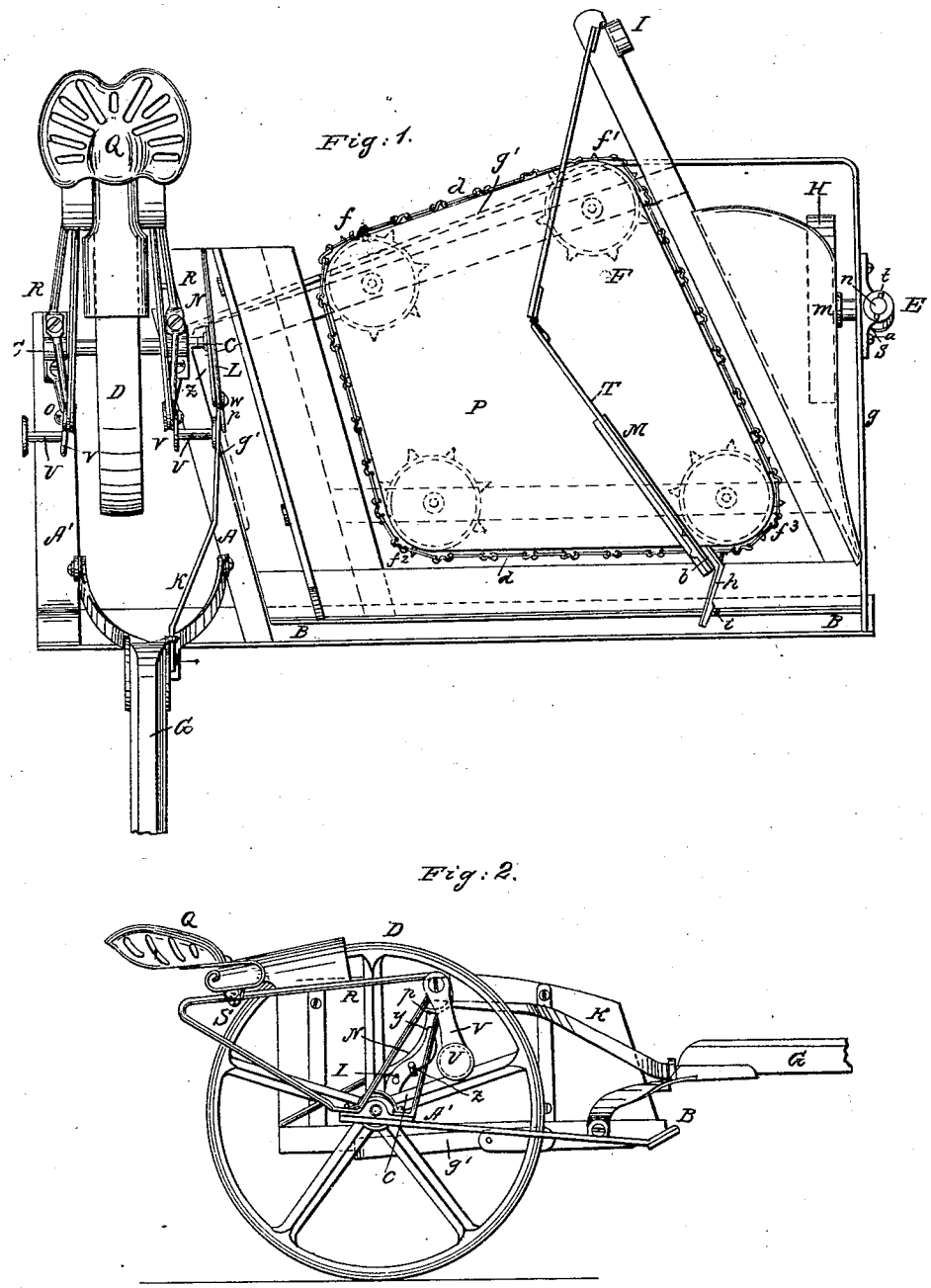
Witnesses
F. W. Wurster.
Chas. H. Leonard.
Inventor:
D. L. Emerson.
by his attorney
E. S. Renwick.
N. PETERS, Photo-Lithographer, Washington, D. C.

D. L. EMERSON.
Harvester.
No. 68,615.
2 Sheets—Sheet 2.
Patented Sept. 10, 1867.
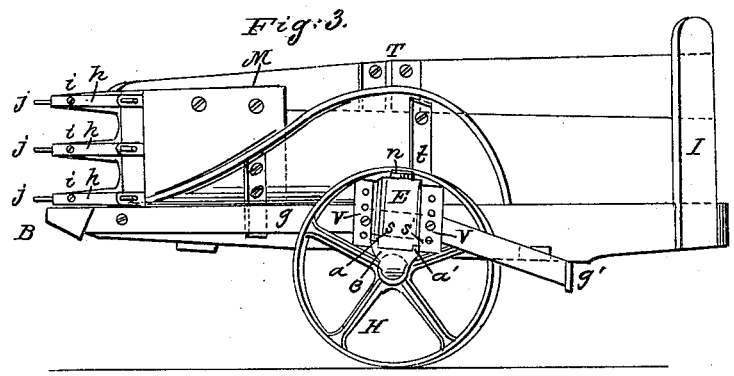
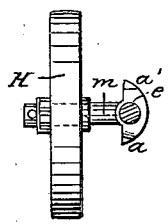
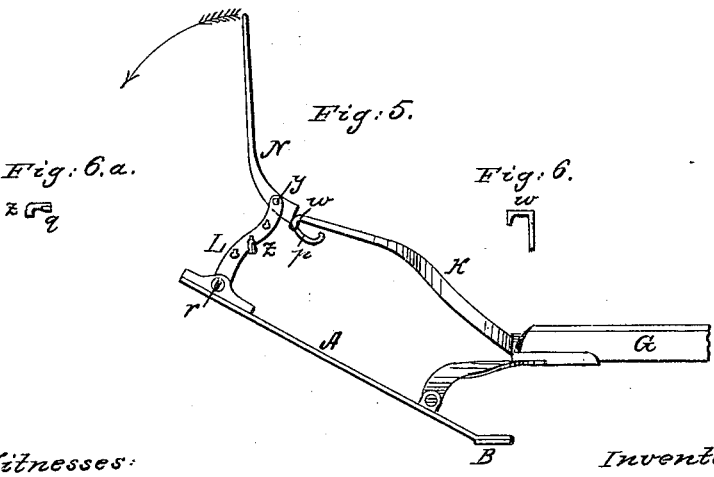
Witnesses:
F. W. Wurster.
Chas H. Leonard
Inventor:
D. L. Emerson.
by his Attorney
C. S. Renwick

United States Patent Office.

DANIEL L. EMERSON, OF ROCKFORD, ILLINOIS.

Letters Patent No. 68,615, dated September 10, 1867.

IMPROVEMENT IN HARVESTERS.

The Schedule referred to in these Letters Patent and making part of the same.

TO ALL WHOM IT MAY CONCERN:

Be it known that I, DANIEL L. EMERSON, of Rockford, in the county of Winnebago, and State of Illinois, have invented certain new and useful Improvements in Harvesters; and that the following is a full, clear, and exact description of the same, reference being had to the accompanying drawing, in which—

Figure 1 represents a plan of certain parts of a harvester constructed according to my invention.

Figure 2 represents an elevation of the stubble-end thereof.

Figure 3 represents a similar view of the grain-end thereof

Figure 4 represents a top view of the grain-wheel and its arm, detached from the machine; and Figures 5 and 6 represent views of the apparatus for raising the finger-beam.

The first part of my invention consists of a peculiar harvester-frame, which droops behind the axles of the running wheels, so as to permit the rear of the platform to run nearer the ground than it otherwise could.

The second part of the invention consists of the combination of the grain-wheel with the frame of the machine, by means of an arm so arranged as to permit the wheel to turn horizontally to a limited extent, in order that the grain-wheel may occupy the proper position when the machine is running directly forward, and may also, when the machine is turning a corner, assume a position which permits the machine to turn freely.

The third part of my invention has reference to the rakes of harvesters, and consists of a rake-head, with tooth-sockets, provided with pinch-screws, or other means of securing the rake-teeth, so that the teeth held in such sockets may be set to project to greater or less extents, to adapt them to operating with the best advantage upon grain, under the various circumstances which occur in practice.

The fourth part of my invention has reference to the raising and lowering of the finger-beam and its appurtenances, for the purpose of passing obstacles, or cutting at a greater or less distance from the ground. This part of my invention consists of the combination of the frame of the machine and the draught-bar by a hinge and by a hooked lever, a swinging standard therefor, and an arm projecting from the draught-bar, so that the operator can raise or lower the finger-beam by moving said lever.

The fifth part of my invention has reference to the holding of the finger-beam in a definite raised position by the mechanism for lifting it, and consists of the arrangement of the aforesaid lever and hinged standard therefor, in such positions, relatively to the arm of the draught-bar on which the lever acts, that the lifting mechanism locks itself (without the use of catches) when the finger-beam is raised a certain distance.

The sixth part of the invention has reference to securement of the finger-beam when raised to different heights, and consists of the combination of the aforesaid hooked lever with a swinging standard, perforated with a series of holes, and with a movable pin fitted to enter any one of said holes, so that the height at which the finger-beam is secured is determined by the position of said movable pin.

The seventh part of my invention has reference to the means of balancing the machine by the weight of the driver, and consists of the combination of the driver's seat with the frame of the machine by ways arranged at opposite sides of the driving-wheel, so that the seat can be slid towards or from the finger-beam, to adapt the position of the seat to drivers of different weights.

The eighth part of the invention has reference to the support for the feet of the driver, its object being to enable such support to be easily adjusted to the size and position of the driver. It consists of the combination of the frame of the machine with a pair of hanging adjustable stirrups, which can be moved towards and from the finger-beam.

All of my improvements are embodied in the machine, parts of which are represented in the annexed drawing. The frame of this machine is formed of wrought-iron bars.

At the driving-wheel end, or stubble-end of the machine, there are two bars A A', which extend in straight lines from the finger-beam B to the boxes c c of the driving-wheel D. At the grain-end of the machine a single bar, g, is employed, which, commencing at the finger-beam B, extends backwards in a straight line to the box E, that sustains the grain-wheel arm; thence it droops, as it extends further backwards, until it is low enough to hold the rear of the platform F at the required height. The bar is then extended crosswise under the rear of the platform, (as indicated by the dotted lines g' in fig. 1,) until it reaches the stubble-end thereof, where the bar is returned forwards, and is secured to one of the bars A that hold the boxes of the driving-wheel D.

The frame thus formed droops in the rear of grain-wheel, as seen in fig. 3, and droops also at the driving-wheel below the axle thereof, the droop at the grain-wheel end being obtained by bending the bar of the frame downwards, and at the driving-wheel by arranging the bar of the frame to branch from the bar A, sustaining the driving-wheel box, as seen at figs. 1 and 2.

The grain-wheel H of the machine is constructed to revolve upon an arm, $m$, which projects horizontally from an upright spindle, $n$, and this spindle is received in a box, E, secured to the frame of the machine. The shoulder $e$ of the upright spindle is provided with two stops, one of which, $a$, bears against a snug, $s$, on the box, when the machine is running directly forward, and prevents the arm $m$ and the wheel running upon it from turning backward beyond the proper position for running with the best advantage, which position is with the axis of the wheel, perpendicular, or thereabouts, to the line of progression of the machine. The other stop $a'$ is set in such a position, relatively to a second snug, $s'$, upon the box E, that when the machine is turning a corner, and when the strain naturally tends to move the grain-end of the machine backward, the arm of the grain-wheel is permitted to turn forward a limited distance, and is then held in its position by the contact of the second stop $a'$, with its snug $s'$. This second stop is so set, relatively to the snug, that the position in which the arm is so held is radial or thereabouts to the circle in which the machine turns, so that the grain-wheel may rotate freely on its arm without material sliding over the ground. The advantages that result from this combination are that the machine can be turned with greater ease by the team, and that the frame of the machine is less strained; moreover, as the wheel turns instead of slides, it does not scrape up the earth in the field. This improvement is not limited to the peculiar construction of the parts represented in the drawing, as it is evident that a single double-sized stop may be formed upon the shoulder of the arm of the grain-wheel, and a socket to receive it and limit the movement may be formed in the box of the upright spindle; or the stop and socket may be reversed. The spindle $n$ is held in its box by a pin, $t$, and the box is provided with a number of holes, for the bolts $v\ v$ that secure it to the frame of the machine, so that the frame may be raised or lowered upon the box, as required to cut grain at different distances from the ground.

The raking mechanism of the machine consists of a rake, M, and the mechanism for operating it. The rake-head $b$ is held erect, and its teeth are caused to point in the proper directions by connecting it, by means of a jointed radius-bar, T, with an upright post, I. The progressive movement is imparted to it by connecting it with an endless chain, $d$, running upon sprocket-wheels $f\ f^1\ f^2\ f^3$, one of which is connected with the driving-wheel D, so as to be turned by it when the machine is drawn forward. The rake-head is guided in its movement by the periphery of a part of the platform P, which it runs around in its movement. As the means of connecting the driving-wheel with the rake mechanism form no part of my present invention, I have not deemed it necessary to represent them. A convenient mode of effecting the connection is by shafting and cog-wheels, and two at least of the cog-wheels should be bevelled, so as to change the direction of the motion. The rake-head $b$ is formed of iron, with sockets $h\ h\ h$ for the rake-teeth $j\ j\ j$, so that the working-ends of the latter can be set to project greater or less distances from the rake-head, and the rake-teeth may be secured in the positions in which they are set by means of pinch-screws $i\ i\ i$, one of which is fitted to each tooth-socket.

When the machine is employed to reap short grain the teeth may be set to protrude sufficiently beyond their sockets to gather it thoroughly; and if the reel be set so that its ribs revolve close to the rake-head the lower teeth may be set to protrude forward beneath the ribs of the reel when in their lowest positions. When, on the other hand, the machine is employed to reap heavy lodged grain, inclining towards the machine and overlapping the finger-beam, the rake-teeth may be set to protrude little if any beyond their sockets, so as to adapt them to the circumstances under which they are to operate.

In order that the finger-beam of the machine may be easily raised by the driver, the draught-bar G (which may either be the tongue to which the horses are hitched, or a beam extending forward and supported by a carriage or by a caster-wheel) is hinged at its rear to the frame of the machine, and is provided with an arm, $k$, that extends backwards over the frame. Moreover, the frame is fitted with a standard, L, swinging on a pivot, $r$, and with a hooked lever, N, that is pivoted to the upper end of said standard in such position that its hooked extremity $p$ can engage with a horn, $w$, projecting from the arm $k$ of the draught-bar. Hence the operator, by moving said hooked lever N, can raise or lower the finger-beam, the fulcrum-pivot $y$ of the hooked lever N being permitted to move forward by the swing of the fulcrum-standard L as the finger-beam rises, so that the hooked lever and standard adapt themselves to the varying position of the arm $k$ of the draught-bar.

In order that the finger-beam may be secured when raised, the fulcrum-standard L and hooked lever N are so arranged, relatively to the position of the horn $w$ of the draught-bar arm, that when the lever is turned beyond a certain distance the fulcrum-pivot $y$ swings forward of the line passing through the lower pivot $r$ of the standard and the horn $w$, so that the strain then presses the handle of the lever downwards, in contact with the frame of the machine, or some other stop to its movement, and holds the lever in its locked position, thereby holding the finger-beam in its position.

As the apparatus should be capable of holding the finger-beam in different positions when the machine is used for reaping, the standard L is perforated with holes, and a pin, $z$, is provided, to enter any one of said holes and stop the movement of the hooked lever, so that, by shifting the pin from one hole to another, the lever may be stopped in a different position, and the position of the finger-beam be correspondingly varied.

In order that the pin $z$ may not slip out of the hole, it is provided with a head, (which, by its weight, tends to hang downward,) and with a feather, $q$, Figure 6$^a$. The holes in the standard also are slotted at one side for the passage of the feather, and the position of the slot is such that the feather cannot be passed through it when the head of the pin is hanging downwards in the position naturally assumed by it. Hence the feather can be inserted or withdrawn only when the pin is partially turned; and as the weight of the head opposes such turning, the pin cannot disengage itself from the standard.

In order that the position of the driver's seat may be changed, so that drivers of different weights may balance the machine equally, the driver's seat Q is fitted to slide over the driving-wheel, towards and from the finger-beam, upon a pair of ways, R R, so that the weight of the driver may be shifted. The seat is also provided with a clamp, S, by which it may be secured in any desired position, and with springs, to lessen the jars incident to riding. The driver straddles the ways, and his feet are supported by a pair of stirrups U.

In order that these stirrups may be adjusted to the position of the driver, or the length of his legs, each stirrup is suspended by a link, V, from a pivot-bolt, o, above them, so that the stirrup can be moved to and fro, to place it at the required distance from the driver's seat Q to suit the driver. As the stirrup should be rigid, to enable the driver to bear against it, each stirrup is secured in the position in which it is placed by tightening the pivot-bolt o.

What I claim as my invention, and desire to secure by Letters Patent, is—

1. The drooping harvester-frame hereinbefore described, the droop at the grain-wheel being produced by the bend of the bar of the frame, and at the driving-wheel by the branching of the frame, substantially as above set forth.

2. I also claim the combination of the grain-wheel with the frame of the machine, by means of an arm so arranged as to permit the said wheel to turn horizontally a limited distance, substantially as set forth.

3. I also claim the combination with the rake-head of the tooth-sockets, rigidly secured thereto, through which sockets the rake-teeth project, and move endwise, transversely to the rake-head, and are held by pinch-screws, as described.

4. I also claim the combination of the frame of the harvester and the draught-bar thereof by a hinge, hooked lifting-lever, swinging standard, and arm, substantially as set forth.

5. I also claim the arrangement of the arm of the draught-bar, the hooked lifting-lever, and swinging fulcrum-standard, in such relative positions that the strain upon the lever tends to lock the members in their positions when the finger-beam is raised beyond a certain distance.

6. I also claim the combination of the frame of the harvester, draught-bar, hooked lifting-lever, perforated swinging-standard, arm, and pin, substantially as set forth.

7. I also claim the combination of the frame of the machine and driver's seat with adjustable hanging stirrups, substantially as set forth.

In testimony whereof I have hereunto set my hand this twenty-second day of December, 1865.

DANIEL L. EMERSON.

Witnesses:
J. LYON,
J. G. MANLOVE.